United States Patent
Inukai

(10) Patent No.: US 8,965,236 B2
(45) Date of Patent: Feb. 24, 2015

(54) POWER SUPPLY SYSTEM AND IMAGE FORMING APPARATUS HAVING THE POWER SUPPLY SYSTEM

(71) Applicant: Brother Kogyo Kabushiki Kaisha, Nagoya-shi, Aichi-ken (JP)

(72) Inventor: Katsumi Inukai, Iwakura (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/224,519

(22) Filed: Mar. 25, 2014

(65) Prior Publication Data
US 2014/0293360 A1    Oct. 2, 2014

(30) Foreign Application Priority Data

Mar. 27, 2013   (JP) .................................. 2013-066390

(51) Int. Cl.
*G03G 15/00*    (2006.01)
*H02M 3/335*    (2006.01)
*H04N 1/00*    (2006.01)

(52) U.S. Cl.
CPC ....... *H02M 3/33561* (2013.01); *G03G 15/5004* (2013.01); *H04N 1/00885* (2013.01)
USPC ............... 399/88; 399/37; 399/89; 358/1.14; 358/1.15; 348/372; 348/730; 345/52; 345/211

(58) Field of Classification Search
None
See application file for complete search history.

(56) References Cited

U.S. PATENT DOCUMENTS

| | | | | |
|---|---|---|---|---|
| RE39,060 | E * | 4/2006 | Okui et al. | 363/45 |
| 8,494,383 | B2 * | 7/2013 | Shimura et al. | 399/37 |
| 8,521,049 | B2 * | 8/2013 | Chosokabe et al. | 399/67 |
| 8,761,631 | B2 * | 6/2014 | Shimura | 399/88 |
| 2009/0256486 | A1 * | 10/2009 | Lai | 315/200 R |
| 2010/0061127 | A1 * | 3/2010 | Katou et al. | 363/126 |
| 2011/0318039 | A1 * | 12/2011 | Watanabe | 399/69 |
| 2013/0111237 | A1 * | 5/2013 | Inukai | 713/320 |
| 2013/0129373 | A1 * | 5/2013 | Inukai | 399/88 |
| 2013/0136467 | A1 * | 5/2013 | Naganawa | 399/37 |

(Continued)

FOREIGN PATENT DOCUMENTS

| | | |
|---|---|---|
| JP | 2000-243584 A | 9/2000 |
| JP | 2010-239774 A | 10/2010 |

OTHER PUBLICATIONS

U.S. Appl. No. 14/225,907, "Power Supply System and Image Forming Apparatus Having the Power Supply System", filed Mar. 26, 2014.

*Primary Examiner* — Dung Tran
(74) *Attorney, Agent, or Firm* — Merchant & Gould PC

(57) ABSTRACT

A power supply system includes: capacitors connected to an alternating current power supply; a rectification circuit connected to the capacitors and rectifying an alternating current voltage applied to the capacitors; a signal generation circuit connected to an output line of the rectification circuit and configured to generate a detection signal corresponding to a zero cross point of an alternating current output; an electricity storage unit connected to the output line of the rectification circuit; a backflow regulation element provided on the output line of the rectification circuit and configured to regulate backflow of current; a current limit element configured to limit current flowing from the output line of the rectification circuit towards the electricity storage unit, and a control unit that is connected to the output line of the rectification circuit, and is configured to detect a zero cross point of the alternating current output.

11 Claims, 7 Drawing Sheets

(56) References Cited

U.S. PATENT DOCUMENTS

| | | | |
|---|---|---|---|
| 2013/0148998 A1* | 6/2013 | Shimura | 399/88 |
| 2013/0195479 A1* | 8/2013 | Tsujihara et al. | 399/33 |
| 2013/0195497 A1* | 8/2013 | Shimura | 399/88 |
| 2014/0186066 A1* | 7/2014 | Inukai | 399/88 |
| 2014/0210264 A1* | 7/2014 | Inukai | 307/23 |
| 2014/0233266 A1* | 8/2014 | Inukai et al. | 363/21.01 |

* cited by examiner

POWER SUPPLY SYSTEM AND IMAGE FORMING APPARATUS HAVING THE POWER SUPPLY SYSTEM

CROSS REFERENCE TO RELATED APPLICATION

This application is based upon and claims the benefit of priority of Japanese Patent Application No. 2013-066390 filed on Mar. 27, 2013, the contents of which are incorporated herein by reference in its entirety.

BACKGROUND

The present disclosure relates to a power supply system and an image forming apparatus having the power supply system, and more particularly, to a technology of detecting a zero cross point of an alternating current voltage.

For example, JP-A-2010-239774 discloses a technology of detecting a zero cross point (zero cross timing) of an alternating current voltage. In the technical document, the zero cross point of the alternating current voltage is detected using a photo coupler.

SUMMARY

According to the method of detecting the zero cross point by using the photo coupler, like the above technical document, the zero cross point can be favorably detected. However, the power consumption, which is consumed by a photo diode of the photo coupler, is not negligibly low. For this reason, a technology of more saving power while maintaining detection reliability of the zero cross point is seriously needed.

An aspect of the present disclosure provides a technology of more saving power while maintaining detection reliability of a zero cross point.

The aspect of the disclosure provides the following arrangements:

A power supply system comprising:

a first capacitor including a first electrode and a second electrode, the first electrode being connected to one end of an alternating current power supply;

a second capacitor including a first electrode and a second electrode, the first electrode being connected to the other end of the alternating current power supply;

a rectification circuit that is electrically connected between the second electrode of the first capacitor and the second electrode of the second capacitor and is configured to rectify an alternating current voltage applied to the first and second capacitors;

a signal generation circuit that is connected to an output line of the rectification circuit and is configured to generate a detection signal corresponding to a zero cross point of an alternating current output of the alternating current power supply, based on an output of the rectification circuit;

an electricity storage unit that is connected to the output line of the rectification circuit at a more downstream position than the signal generation circuit;

a backflow regulation element that is provided on the output line of the rectification circuit and is configured to regulate backflow of current from the electricity storage unit towards the signal generation circuit;

a current limit element configured to limit current flowing from the output line of the rectification circuit towards the electricity storage unit, and a control unit that is connected to the output line of the rectification circuit, and is configured to detect a zero cross point of the alternating current output, based on the detection signal.

DESCRIPTION OF EXEMPLARY EMBODIMENTS

<First Exemplified Embodiment>

A first exemplified embodiment of the present disclosure will be described with reference to FIGS. 1 to 6.

1. Multifunction Apparatus

Figure 1:
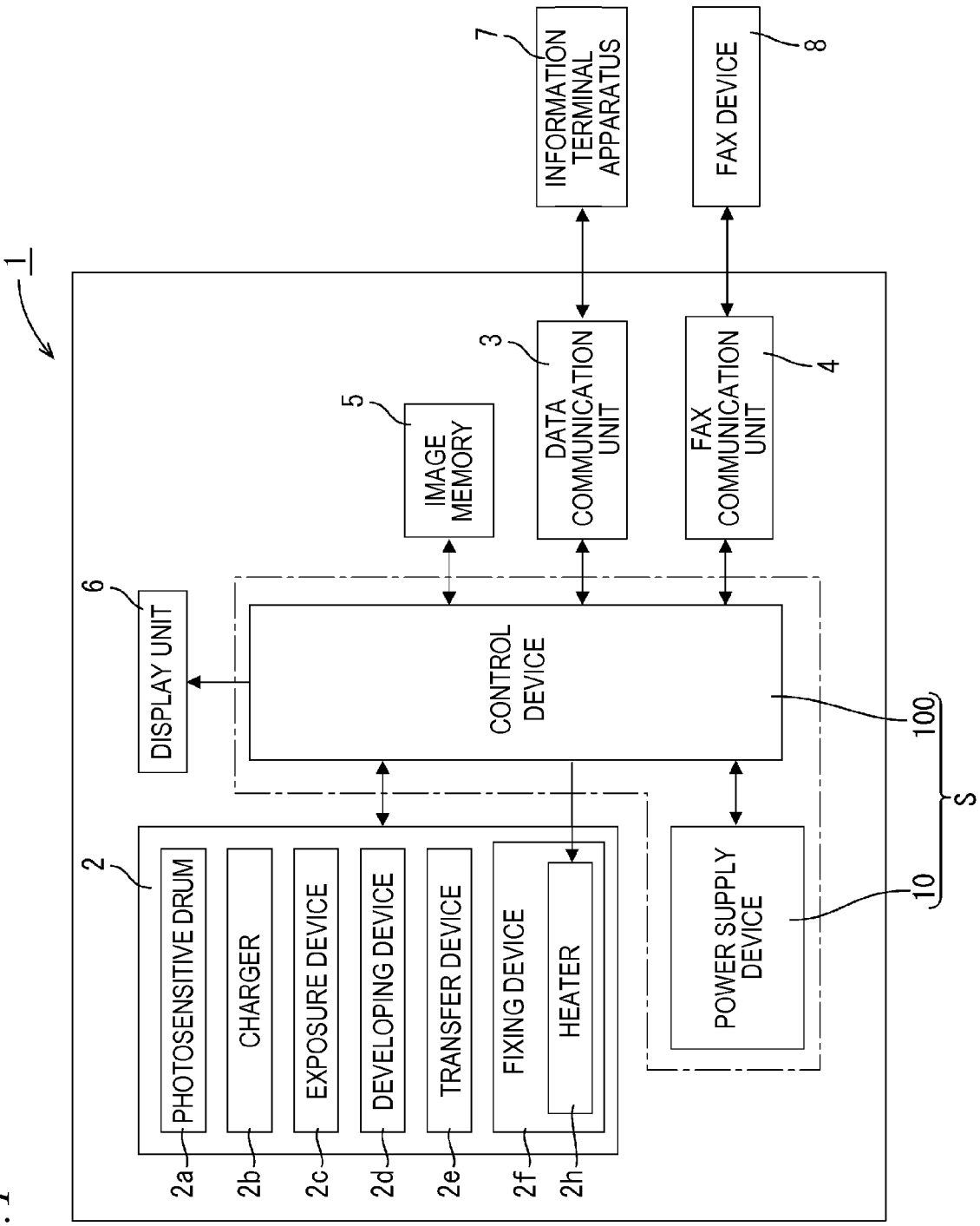
FIG. 1 is a block diagram showing an electrical configuration of a multifunction apparatus according to a first exemplified embodiment.

FIG. 1 is a block diagram showing an electrical configuration of a multifunction apparatus (an example of the image forming apparatus) 1. The multifunction apparatus 1 includes a printing unit 2, a data communication unit 3 that is connected in communication with an information terminal apparatus 7, a FAX communication unit 4 that is connected in communication with a FAX device 8, an image memory 5, a display unit 6 and a power supply system S. The power supply system S is configured by a power supply device 10 and a control device 100. The power supply device 10 is a power supply of the multifunction apparatus 1 and feeds power to the printing unit 2, the data communication unit 3, the FAX communication unit 4, the image memory 5, the display unit 6 and the control device 100. In the meantime, the printing unit 2 is an example of the image forming unit.

The printing unit 2 includes a photosensitive drum 2a, a charger 2b that executes a charging process of charging a surface of the photosensitive drum 2a, an exposure device 2c that executes an exposure process of forming an electrostatic latent image on the surface of the photosensitive drum 2a, a developing device 2d that executes a developing process of attaching developer to the electrostatic latent image formed on the surface of the photosensitive drum 2a to thus form a developer image, a transfer device 2e that executes a transfer process of transferring the developer image to a recording medium, a fixing device 2f that executes a fixing process of fixing the developer image transferred onto the recording medium, and the like.

The printing unit 2 executes the charging process, the exposure process, the developing process, the transfer process and the fixing process, thereby executing printing processing of printing print data or FAX data on the recording medium. The data communication unit 3 performs data communication with the information terminal apparatus 7 such as a PC and receives a printing instruction and print data from the information terminal apparatus 7. The FAX communication unit 4 performs FAX communication with the FAX device 8 and receives FAX data from the FAX device 8. The image memory 5 temporarily stores therein the print data or FAX data received from the information terminal apparatus 7 or FAX device 8.

When the data communication unit 3 receives a printing instruction from the information terminal apparatus 7 to thus receive print data and when the FAX communication unit 4 receives FAX data, the control device 100 of the multifunction apparatus 1 enables the printing unit 2 to execute the printing processing consisting of the charging process, the exposure process, the developing process, the transfer process and the fixing process, thereby printing the print data or FAX data on the recording medium. In the meantime, while an operating voltage of the printing unit 2 is 24V, operating voltages of the data communication unit 3, the FAX communication unit 4, the image memory 5, the display unit 6 and the control device 100 are 3.3V.

2. Circuits of Power Supply System

A configuration of the power supply system S is described with reference to FIGS. 2 and 3. The power supply device 10 includes a switching power supply 20, a small capacity power supply circuit 40, an electric double-layer capacitor C6 serving as an electricity storage unit, a signal generation circuit 60, a diode D8 for backflow regulation, and the like.

Figure 2:
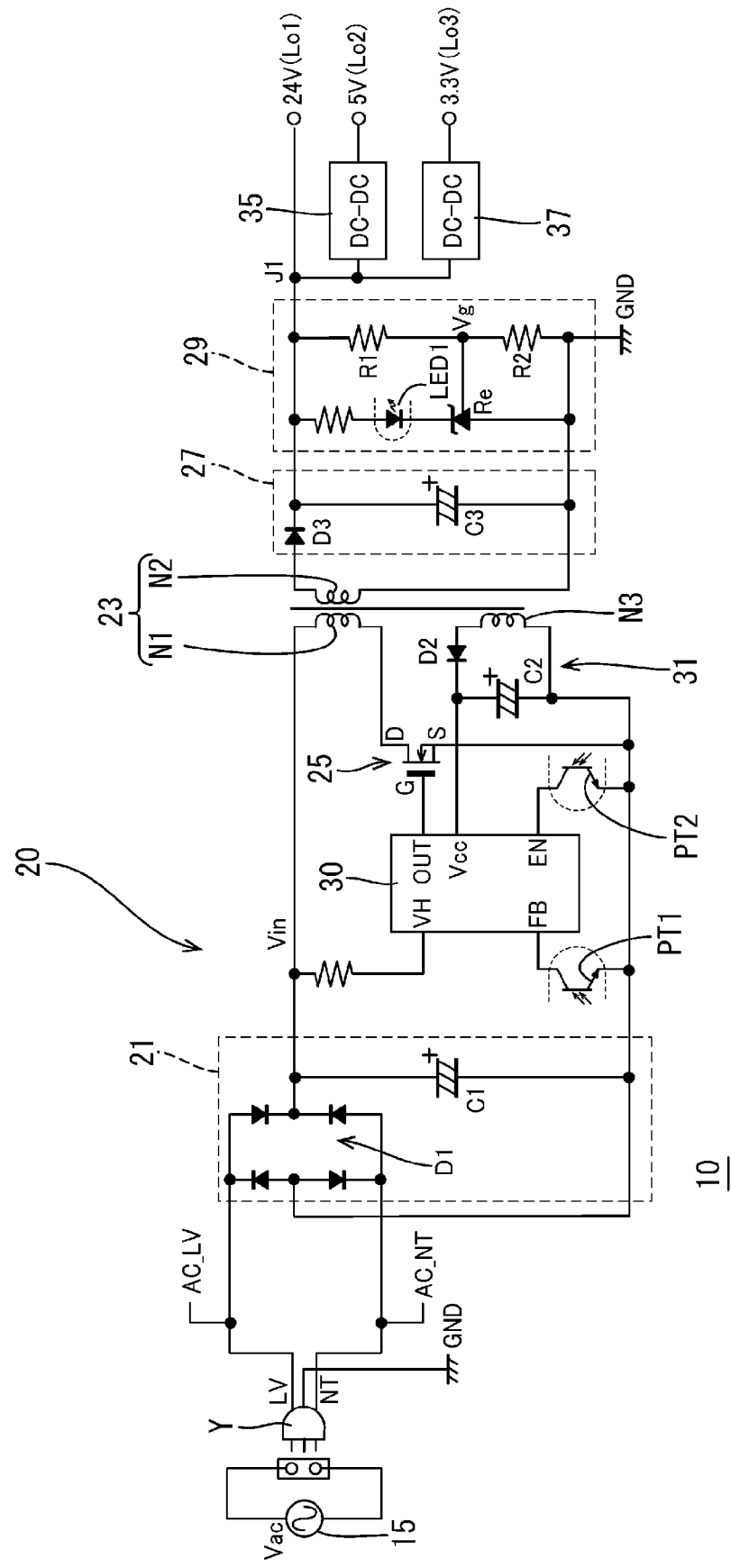
FIG. 2 is a circuit diagram of a power supply device (showing a switching power supply-side).

FIG. 2 is a circuit diagram showing a configuration of the switching power supply 20 of the power supply device 10 of the power supply system S. The switching power supply 20 includes a rectification smoothing circuit 21, a transformer 23, a FET (field effect transistor) 25, a rectification smoothing circuit 27, a voltage detection circuit 29 and a control IC 30 that switching-controls the FET 25 and has a function of converting an alternating current (AC) voltage from an AC power supply 15 to a predetermined direct current (DC) voltage and outputting the same.

The rectification smoothing circuit 21 is a so-called capacitor input type and includes a bridge diode D1 that rectifies the AC voltage of the AC power supply 15 and a capacitor C1 that smoothes the rectified voltage. An output-side of the rectification smoothing circuit 21 is provided with the transformer 23, so that an input voltage Vin, which is obtained by rectifying and smoothing the AC voltage, is applied to a primary coil N1 of the transformer 23.

The FET 25 is an N-channel MOSFET and has a drain D that is connected to the primary coil N1 and a source S that is connected to a reference potential of the primary-side. An on-off signal (PWM signal) is applied from an output port OUT of the control IC 30 to a gate G, so that the FET 25 becomes on and off with a predetermined period. Thereby, the primary-side of the transformer 23 oscillates, so that a voltage is induced to a secondary coil N2 of the transformer 23.

The primary-side of the transformer 23 is provided with a voltage generation circuit 31. The voltage generation circuit 31 rectifies and smoothes a voltage, which is induced to an auxiliary coil N3 provided to the primary-side of the transformer 23, by a diode D2 and a capacitor C2. The voltage generation circuit 31 becomes a power supply (about 20V) of the control IC 30.

The rectification smoothing circuit 27 is provided at the secondary-side of the transformer 23 and is configured by a diode D3 and a capacitor C3. The rectification smoothing circuit 27 rectifies and smoothes the voltage induced to the secondary coil N2 of the transformer 23. Thereby, the switching power supply 20 outputs a voltage of DC 24V through an output line Lo1.

As shown in FIG. 2, the output line Lo1 is branched into three lines at a branch point J1, and the branched lines are provided with DC-DC converters 35, 37, respectively. The DC-DC converter 35 drops the output voltage 24V of the switching power supply 20 to 5V and outputs the same from an output line Lo2. The DC-DC converter 37 drops the output voltage 24V of the switching power supply 20 to 3.3V and outputs the same from an output line Lo3. Like this, the switching power supply 20 is configured to output the three voltages of 24V/5V/3.3V.

The voltage detection circuit 29 is provided between the rectification smoothing circuit 27 and the branch point J1 of the output line. The voltage detection circuit 29 is to detect a level of the output voltage Vo1 (DC 24V) of the switching power supply 20 and is configured by a pair of detection resistances R1, R2, a shunt regulator Re and a light emitting diode LED1 that is connected in series with the shunt regular Re.

The detection resistances R1, R2 are provided between the output line Lo1 and a reference potential GND of the secondary-side and detect a divided voltage Vg that is obtained by dividing the output voltage Vo1 by a resistance ratio. The shunt regulator Re enables current to flow, which corresponds to a level difference between a reference voltage in the shunt regulator Re and the divided voltage Vg. Thereby, the current flows through the light emitting diode LED1 and the light emitting diode LED1 outputs a light signal having a light quantity corresponding to the level difference between the reference voltage and the divided voltage Vg.

The light emitting diode LED1 configures a photo coupler together with a photo transistor PT1 connected to a feedback port FB of the control IC 30. For this reason, the light signal of the light emitting diode LED1 is returned as an electric signal by the photo transistor PT1. Thereby, a signal (hereinafter, referred to as a feedback signal), which indicates the level difference of the divided voltage Vg relative to the reference voltage of the shunt regulator Re, is input (feedback) to the feedback port FB of the control IC 30.

As shown in FIG. 2, the control IC 30 includes a power supply port VCC that is connected to the voltage generation circuit 31, a high voltage input port VH that is connected to a power supply line through a resistance, the feedback port FB to which the feedback signal is input, an output port OUT that outputs an on-off signal (PWM signal) and an EN port to which a mode switching signal Sr (refer to FIG. 3) is input.

After the power supply is input, the control IC 30 starts switching control (on-off control) of the FET 25 to thus control the switching power supply 20 to an output state. The control IC 30 includes a PWM comparator (not shown) and an oscillation circuit (not shown) that oscillates a triangular wave. When the feedback signal is input to the feedback port FB, the control IC 30 generates a PWM signal corresponding to the feedback signal and outputs the same to the gate G of the FET 25 through the output port OUT. Thereby, the output voltage (DC 24V) of the switching power supply 20 is controlled to be a target voltage. Additionally, the control IC 30 has a function of stopping and resuming the switching control (on-off control) of the FET 25, in response to the mode switching signal Sr that is output from the control device 100, which will be described later. In the below descriptions, a non-grounded side power supply line of a pair of power supply lines connected to the AC power supply 15 is referred to as a live LV-side and a grounded-side power supply line is referred to as a neutral NT-side.

Figure 3:
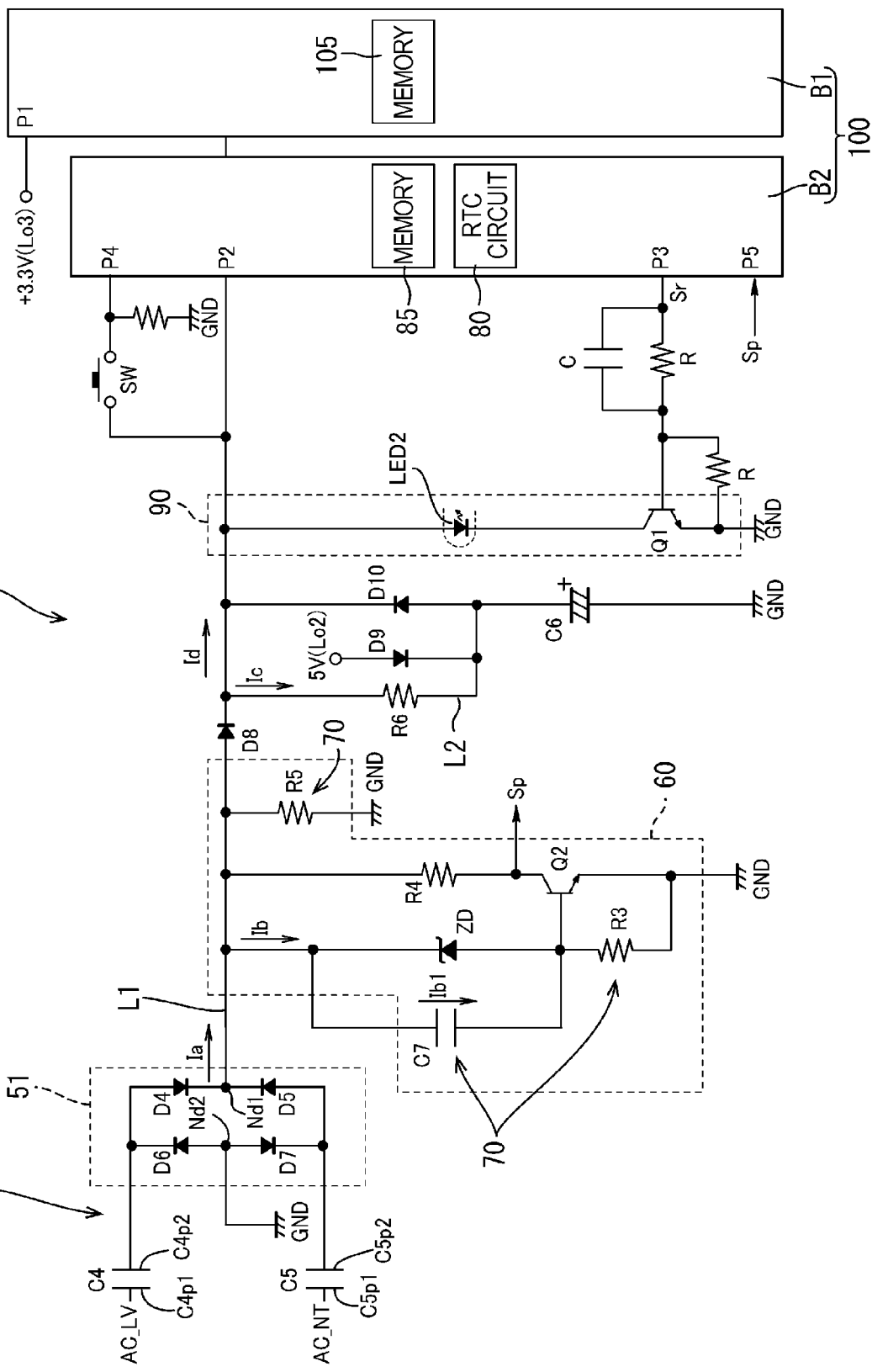
FIG. 3 is a circuit diagram of the power supply device (showing a small capacity power supply circuit, a signal generation circuit, an electric double-layer capacitor, a control device and the like).

FIG. 3 is a circuit diagram in which the other elements of the power supply system S, except for the switching power supply 20 of the power supply device 10, i.e., the small capacity power supply circuit 40, the signal generation circuit 60, the electric double-layer capacitor C6 serving as the electricity storage unit, the diode D8 for backflow regulation and the control device 100, are added to a circuit configuring the power supply device 10. In the meantime, the control device 100 is an example of the 'control unit'. A reference numeral 'SW' of FIG. 3 indicates a panel switch with which a user instructs switching of an operation mode.

The control device 100 includes a main block B1 and a mode control block B2. The respective blocks B1, B2 may be configured by one or more CPUs, a hardware circuit such as an ASIC and the like or a combination of a CPU and a hardware circuit. In this exemplified embodiment, the respective blocks B1, B2 have memories 105, 85 embedded therein, respectively.

A power supply port P1 of the main block B1 is connected to the output line Lo3 (refer to FIG. 2) of the DC-DC converter 37 and is fed with the power from the switching power supply 20 through the DC-DC converter 37. The main block B1 controls the entire multifunction apparatus 1 including the printing unit 2 and has a function of executing the printing processing of printing the FAX data and print data.

The mode control block B2 has a function of switching an operating mode of the switching power supply 20 between an output mode (an example of the 'output state') and a power saving mode (an example of the 'output stop state'), in response to an operation of the panel switch SW. Specifically, in the above exemplified embodiment, the panel switch SW for instructing the switching of the operating mode is provided for the display unit 6. The panel switch SW has one end that is connected to a power supply line L3 and the other end that is connected to an input port P4 provided to the mode control block B2. The other end is connected to the reference potential GND through a resistance. For this reason, when the user operates a panel switch SW2, a voltage of the input port P4 is switched from a low level to a high level. In the meantime, the mode control block B2 is provided with a control port P3. The control port P3 is connected to a base of a transistor Q1 through a resistance to which a capacitor is connected in parallel. The transistor Q1 configure a switching circuit 90 for switching an operating mode of the switching power supply 20, together with a light emitting diode LED2.

The transistor Q1 has an emitter that is connected to the reference potential GND and a collector that is connected to a cathode of the light emitting diode LED2. The light emitting diode LED2 has an anode that is connected to the power supply line L3. The light emitting diode LED2 configures the photo coupler together with a photo transistor PT2 (refer to FIG. 2). A resistance is connected between a base and the emitter of the transistor Q1.

When the user operates the panel switch SW, the mode control block B2 outputs the mode switching signal Sr from the control port P3, in response to the switching of the voltage of the input port P4. When the mode switching signal Sr is output, the transistor Q1 becomes on, so that the light emitting diode LED2 turns on and outputs a light signal. The light signal (the mode switching signal Sr) of the light emitting diode LED2 is returned as an electric signal by the photo transistor PT2 and is input to the EN port of the control IC 30. Then, the control IC 30 stops and resumes the switching control (on-off control) of the FET 25, in response to the input of the mode switching signal Sr, so that the operating mode of the switching power supply 20 is switched between the output mode and the power saving mode.

The output mode is a mode where the control IC 30 executes the switching control to thus switch the switching power supply 20 to the output state. In the output mode, the multifunction apparatus 1 can immediately execute the printing processing, i.e., the multifunction apparatus 1 is executing the printing processing, in response to the printing instruction. Meanwhile, in the power supply system S, when the power is input (a power supply plug is connected to the AC power supply 15), the control IC 30 starts the switching control to thus shift the switching power supply 20 to the output mode. The power saving mode is a mode where the switching control of the control IC 30 is stopped to stop the output of the switching power supply 20. In the power saving mode, the main block B1 of the control device 100 is disconnected as regards the power feeding from the switching power supply 20 and is thus stopped. In the meantime, the mode control block B2 is fed with the power from the small capacity power supply circuit 40 and is thus operated, which will be subsequently described.

The small capacity power supply circuit 40 is connected in parallel with the switching power supply 20 with respect to the AC power supply 15. In the power saving mode where the switching power supply 20 is stopped, the small capacity power supply circuit 40 feeds the power to the mode control block B2 of the control device 100. Specifically, as shown in FIG. 3, the small capacity power supply circuit 40 includes a first capacitor C4, a second capacitor C5 and a bridge-type rectification circuit 51.

The first capacitor C4 includes a first electrode C4p1 and a second electrode C4p2. The first electrode C4p1 is connected to the live LV-side of the AC power supply 15 and the second electrode C4p2 is connected to the rectification circuit 51. The second capacitor C5 includes a first electrode C5p1 and a second electrode C5p2. The first electrode C5p1 is connected to the neutral NT-side of the AC power supply 15 and the second electrode C5p2 is connected to the rectification circuit 51

The first capacitor C4 and the second capacitor C5 have high impedances, which are alternating current resistances, and perform a function of making a capacity of the small capacity power supply circuit 40 small, specifically, limiting output current Ia of the rectification circuit 51 to about dozens to hundreds of µA. In the meantime, the capacities of the first capacitor C4 and the second capacitor C5 are 3,300 pF (picofarad), for example.

The rectification circuit 51 is electrically connected between the second electrode C4p2 of the first capacitor C4 and the second electrode C5p2 of the second capacitor C5, thereby rectifying an AC voltage Vac that is applied to the capacitors C4, C5. The rectification circuit 51 is configured by a bridge circuit consisting of four diodes D4, D5, D6, D7, for example. Cathodes of the diode D4 and the diode D5 are connected at a first connection point Nd1, an anode of the diode D4 is connected to the second electrode C4p2 of the first capacitor C4 and an anode of the diode D5 is connected to second electrode C5p2 of the second capacitor C5.

Anodes of the diode D6 and the diode D7 are connected at a second connection point Nd2, a cathode of the diode D6 is connected to the second electrode C4p2 of the first capacitor C4 and a cathode of the diode D7 is connected to the second electrode C5p2 of the second capacitor C5.

An output line L1 of the rectification circuit 51 is connected to the power supply port P2 of the mode control block B2. Thereby, in the power saving mode where the output of the switching power supply 20 is stopped, the power is fed from the small capacity power supply circuit 40 to the mode control block B2.

The signal generation circuit 60 and the electric double-layer capacitor C6 serving as the electricity storage unit are connected to the output line L1 of the rectification circuit 51 in corresponding order from an upstream side. Meanwhile, in this exemplified embodiment, the upstream side and the downstream side indicate an upstream side and a downstream side in a flowing direction of the current. That is, the upstream side means the power supply-side (the left in FIG. 3) and the downstream side means a load-side (the right in FIG. 3).

The electric double-layer capacitor C6 is connected to the output line L1 of the rectification circuit 51 through a forward diode D10. The forward diode D10 has an anode that is connected to the electric double-layer capacitor C6 and a cathode that is connected to the output line L1 and thus configures a discharge path of the electric double-layer capacitor C6. In the meantime, the forward indicates a direction from the electric double-layer capacitor C6 towards the load-side.

In the power saving mode where the output of the switching power supply 20 is stopped, the electric double-layer capacitor C6 enables discharging current to flow through the forward diode D10 and thus functions as a power supply driving the light emitting diode LED2 of the switching circuit 90. Upon the disconnection of the AC power supply 15, the electric double-layer capacitor C6 functions as a backup power supply for feeding the power to an RTC (which is a circuit measuring current time and is used to detect FAX reception time) 80 provided for the mode control block B2. Meanwhile, the RTC is an abbreviation of 'real-time clock'.

A 5V power output line Lo2 of the switching power supply 20 and the output line L1 of the rectification circuit 51 are commonly connected to one end-side (+side) of the electric double-layer capacitor C6. The 5V power output line Lo2 is connected to the electric double-layer capacitor C6 through a forward diode D9 and the output line L1 of the rectification circuit 51 is connected to the electric double-layer capacitor C6 through a resistance R6 that is a current limit element. The two lines configure charging paths, respectively, and have a configuration of charging the electric double-layer capacitor C6 mainly through the output line Lo2 of the switching power supply 20 while the switching power supply 20 is operating.

The resistance R6 is a high resistance of about 100 kΩ, for example, and only the smaller charging current is enabled to flow through the charging path of the rectification circuit 51-side, compared to the charging path of the switching power supply 20-side. The reason of the configuration is because the charging path of the rectification circuit 51-side has a purpose of compensating for a decrease in a charging amount due to self discharge of the electric double-layer capacitor C6 during the stop of the switching power supply 20. When the resistance R6 is configured by the high resistance, the current is difficult to flow through the charging path of the rectification circuit 51-side, so that it is possible to increase responsiveness (responsiveness upon the input of the power) of the signal generation circuit 60, which will be described later.

The signal generation circuit 60 is a circuit that generates a pulse signal Sp corresponding to the AC voltage Vac of the AC power supply 15, and includes a resistance R3, a transistor Q2, a resistance R4, a zener diode ZD and a reverse voltage applying circuit 70.

The transistor Q2 is an NPN transistor and has an emitter that is connected to the reference potential GND. The transistor Q2 has a collector that is connected to the output line L1 through the resistance R4. The transistor Q2 has a base that is connected to a connection point of the zener diode ZD and the resistance R3. The resistance R3 has one end that is connected to the base of the transistor Q2 and the other end that is connected to the emitter of the transistor Q2.

The zener diode ZD has an anode that is connected to the base of the transistor Q2 and a cathode that is connected to the output line L1. The zener diode ZD has a function of limiting a voltage of the output line L1 of the rectification circuit 51 to a predetermined value (in this example, about 5V) or lower.

Figure 4:
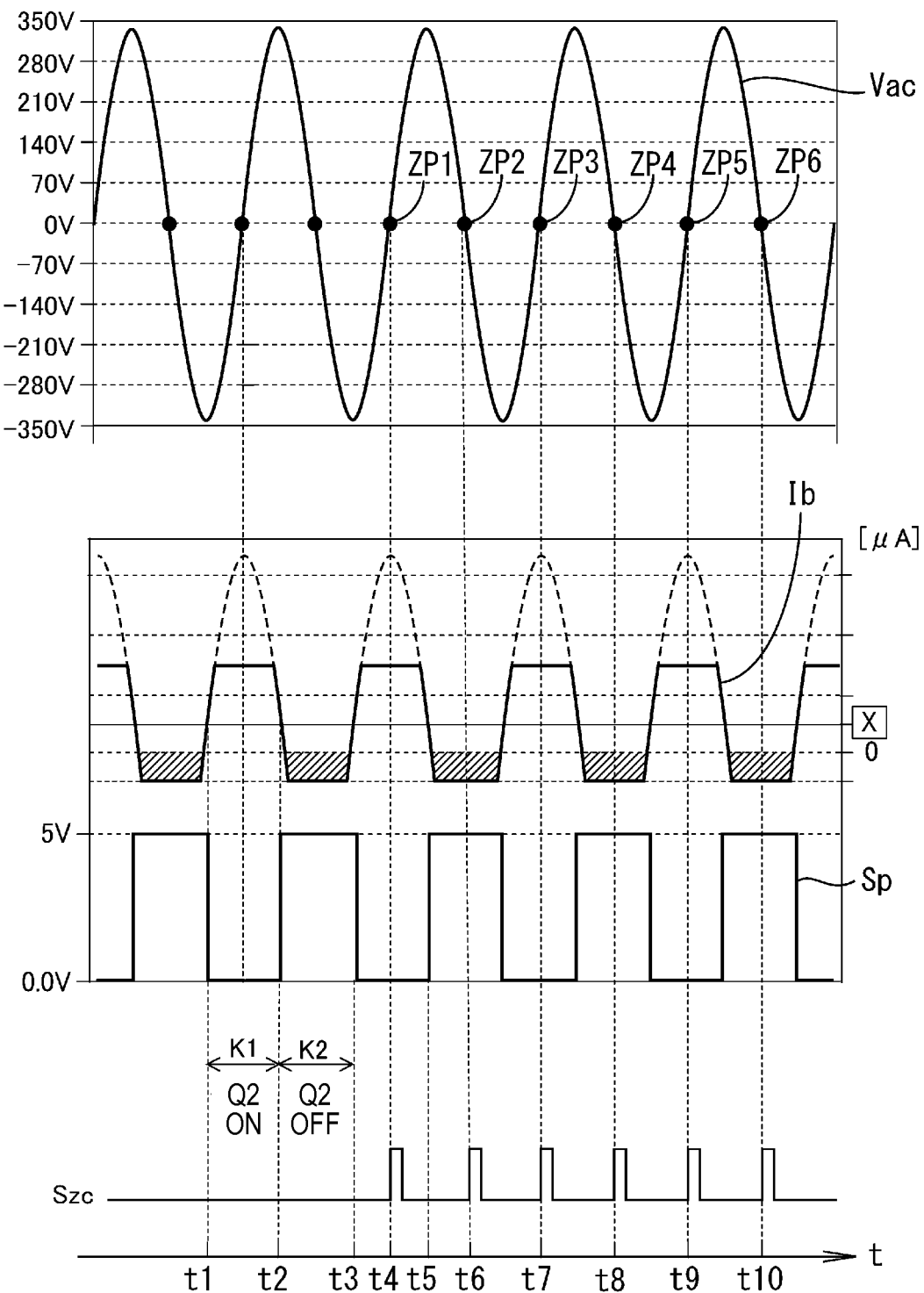
FIG. 4 shows a relation of an alternating current voltage of an alternating current power supply and a pulse signal of the signal generation circuit.
Figure 5:
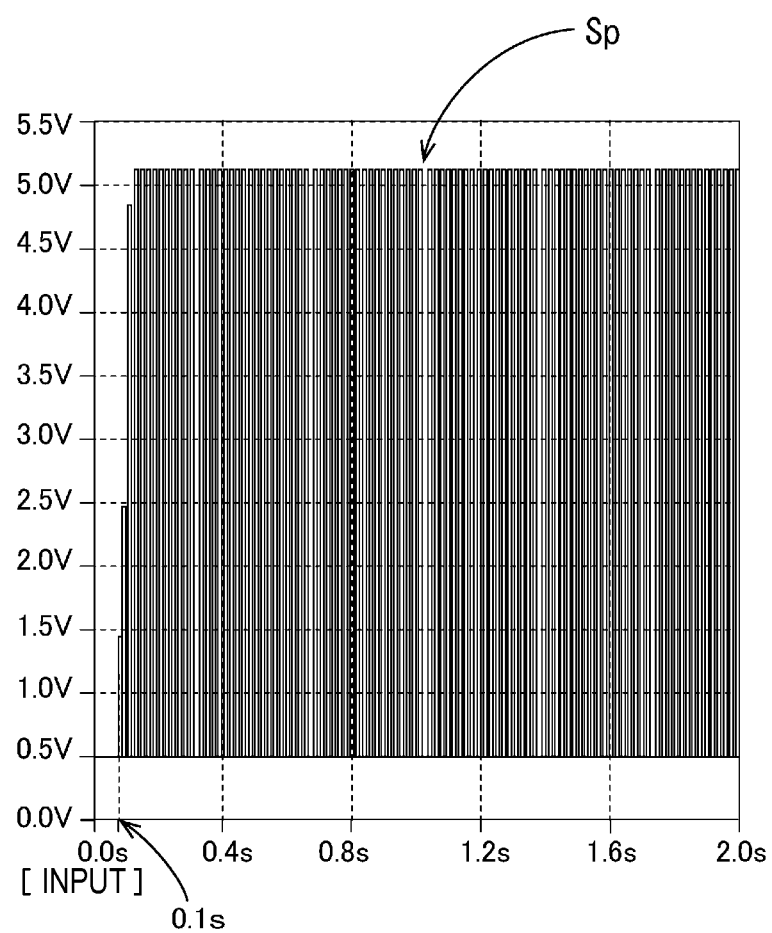
FIG. 5 shows output timing of the pulse signal after power is input.
Figure 6:
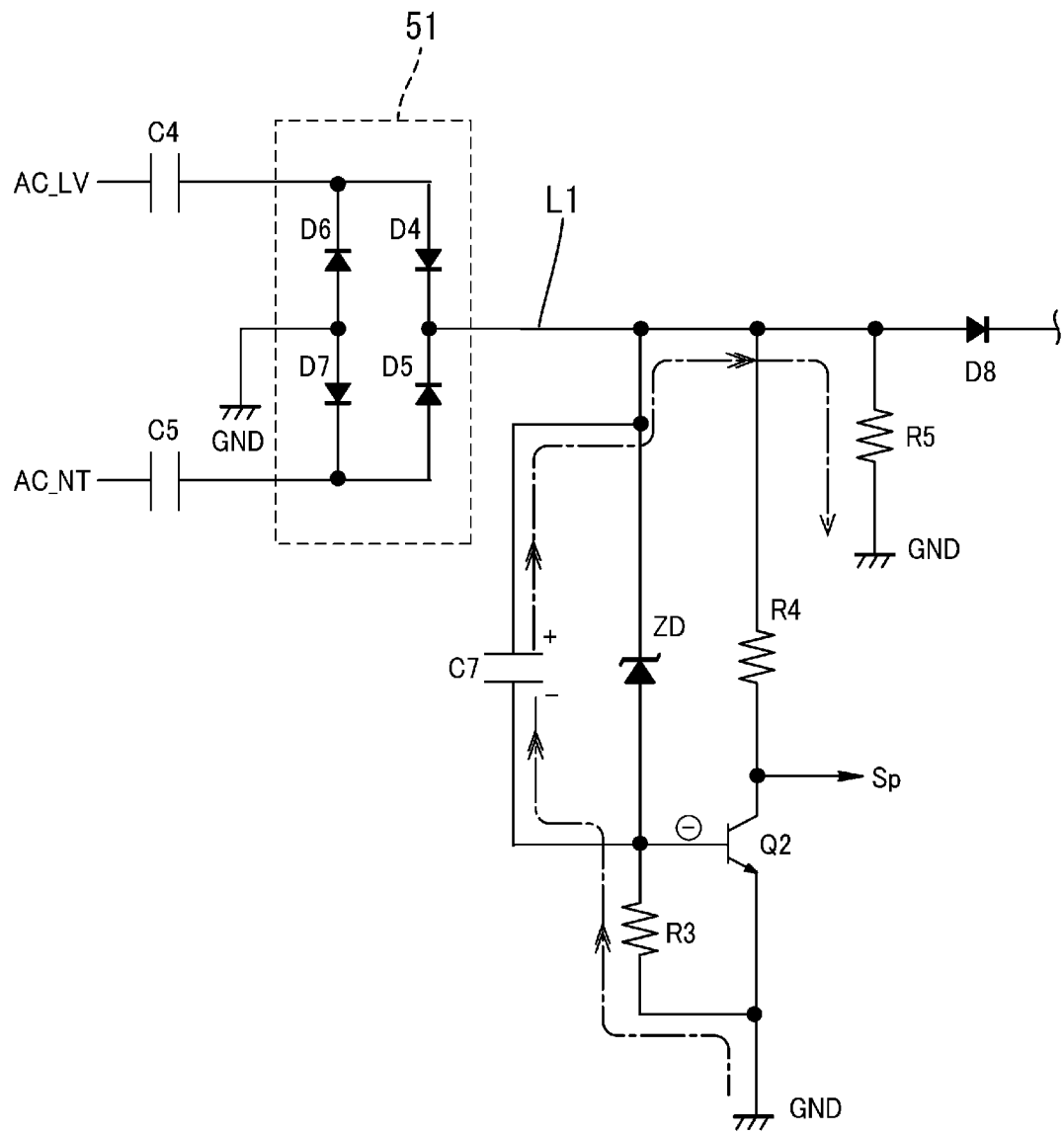
FIG. 6 shows a discharge path of a capacitor.

A part of current Ib that is output from the rectification circuit 51 and is branched towards the signal generation circuit 60 flows to the base of the transistor Q2 through the zener diode ZD1 or capacitor C7. As shown in FIG. 4, during a period (a period K1 in FIG. 4) for which the current Ib is higher than a reference value X, a voltage between the base and emitter of the transistor Q2 exceeds a threshold voltage and the current flowing through the base becomes a predetermined threshold value or larger, so that the transistor Q2 becomes on. During a period (a period K2 in FIG. 4) for which the current is lower than the reference value X, the current flowing through the base becomes smaller than the predetermined threshold value, so that the transistor Q2 becomes off. Since the rectification circuit 51 rectifies the output of the AC power supply 15, the output of the signal generation circuit 60, i.e., the output (a potential of the collector) of the transistor Q2 becomes the pulse signal Sp corresponding to the AC voltage Vac of the AC power supply 15. In this example, the pulse signal is a pulse signal having the same period as the AC voltage Vac and becomes a signal having a phase that is offset with respect to the AC voltage Vac. In the meantime, the transistor Q2 is an example of the 'switching device' and the pulse signal Sp is an example of the 'detection signal'.

An output line of the signal generation circuit 60 (an output line drawn out from the collector of the transistor Q2) is connected to an input port P5 of the mode control block B2 of the control device 100 and the pulse signal Sp output from the signal generation circuit 60 is input to the mode control block B2. For this reason, the input pulse signal Sp is data-processed in the main block B1 or mode control block B2 of the control device 100, so that a zero cross point ZP of the AC voltage Vac of the AC power supply 15 can be detected.

Specifically, as shown in FIG. 4, a phase of the current Ib flowing through the signal generation circuit 60 progresses by 90° with respect to the AC voltage Vac of the AC power supply 15. Therefore, the zero cross point ZP of the AC voltage Vac coincides with a center of the period (the period of a low level) K1 during which the pulse signal Sp is not output or a center of the period (the period of a high level) K2 during which the pulse signal Sp is output. Hence, it is possible to detect the zero cross point ZP of the AC voltage Vac of the AC power supply 15 by detecting the center of the period K1 during which the signal is not output and the center of the period K2 during which the signal is output.

For example, a zero cross point ZP1 shown in FIG. 4 can be obtained by a following equation 1.

$$t4 = t3 + (K1/2) \quad \text{(equation 1)}$$

time t4 is occurrence time of the zero cross point ZP1 and time t3 is ascending time of the pulse signal Sp.

A zero cross point ZP2 shown in FIG. 4 can be obtained by a following equation 1.

$$t6 = t5 + (K2/2) \quad \text{(equation 2)}$$

time t6 is occurrence time of the zero cross point ZP2 and time t5 is ascending time of the pulse signal Sp.

In the meantime, the reason to detect the zero cross point ZP of the AC power supply 15 by using the pulse signal Sp output from the signal generation circuit 60 is because the control device 100 controls the printing unit 2 by using the detection of the zero cross point ZP. Specifically, the control device 100 performs control of an energization amount (firing angle control or wave number control) on a heater 2h configuring the fixing device 2f, based on the zero cross point ZP of the AC power supply 15. A signal Szc shown in FIG. 4 is a zero cross signal that is generated in the control device 100 from a detection result of the zero cross point ZP. The zero cross signal Szc is used to detect timing of the zero cross point ZP when performing the control of an energization amount of the heater 2h. In addition to this, it is possible to detect whether a power supply plug Y is connected to the AC power supply 15, depending on whether or not the zero cross signal Szc.

The diode D8 for backflow regulation is provided on the output line L1 of the rectification circuit 51 between the signal generation circuit 60 and the electric double-layer capacitor C6. The diode D8 has an anode that is connected to the signal generation circuit 60-side and a cathode that is connected to the electric double-layer capacitor C6-side, and has a function of regulating backflow of the current from the electric double-layer capacitor C6 towards the signal generation circuit 60 when the power supply plug Y is disconnected from the AC power supply 15. In the meantime, the diode D8 is an example of the 'backflow regulation element'.

Incidentally, when the power supply plug Y is connected to the AC power supply 15, the switching power supply 20 starts and becomes under output state and the small capacity power supply circuit 40 becomes also under output state. When the power supply plug Y is input at a state where the electric double-layer capacitor C6 is not charged, the charging current flows towards the electric double-layer capacitor C6 through the output line Lo2 of the switching power supply 20-side or output line L1 of the rectification circuit 51.

If all the output current Ia of the rectification circuit 51 flows through the electric double-layer capacitor C6 as the charging current, the current does not flow through the signal generation circuit 60-side and the transistor Q2 continues to be off until the charging is completed. For this reason, it is substantially impossible to detect the zero cross point ZP of the AC power supply 15 until the electric double-layer capacitor C6 is completely charged.

Regarding the above problem, in the power supply system S of this exemplified embodiment, a charging path L2 of the rectification circuit 51-side is provided with a high resistance R6 of about 100 KΩ for example. In the meantime, a resistance value of R3 is 470 KΩ, a resistance value of R4 is 4.7 MΩ and a resistance value of R5 is 22 MΩ, for example.

The high resistance R6 is provided, so that the current (charging current) flowing from the rectification circuit 51 towards the electric double-layer capacitor C6 is limited. For this reason, the current easily flows from the rectification circuit 51 towards the signal generation circuit 60, so that it is possible to supply the current enough to turn on or off the transistor Q2 to the signal generation circuit 60 at an early stage.

More specifically, a resistance value of the resistance R6 is determined to satisfy following equations 3 and 4.

$$Ia=(Ic+id)=Ib \quad \text{(equation 3)}$$

$$Ib \geq Imin \quad \text{(equation 4)}$$

Ia is output current of the rectification circuit 51, Ib is current that is output from the rectification circuit 51 and is branched towards the signal generation circuit 60 (and is also branched to the reverse voltage applying circuit 70), Ic is current that is output from the rectification circuit 51 and is branched towards the electric double-layer capacitor C6 and Id is current that is branched from the rectification circuit 51 towards the control device 100. Imin is the lowest current value (the lowest current value of Ib) that is necessary to normally operate the signal generation circuit 60 and is 2 μA, for example.

From the above configuration, when the power supply plug Y is connected and the switching power supply 20 is thus activated, the current Ib of the lowest current value Imin or larger flows from the rectification circuit 51 towards the signal generation circuit 60, irrespective of whether the electric double-layer capacitor C6 is not charged or not. For this reason, just after the power supply plug Y is connected, the signal generation circuit 60 normally operates and outputs the pulse signal Sp corresponding to the AC voltage Vac of the AC power supply 15. Therefore, it is possible to detect the zero cross point ZP of the AC power supply 15 just after the power supply plug Y is connected (in an example of FIG. 5, about 0.1 s).

In the power supply system S of this exemplified embodiment, the signal generation circuit 60 is provided with the reverse voltage applying circuit 70. The reverse voltage applying circuit 70 includes a capacitor C7, a first discharge resistance R5 and a second discharge resistance R3. The capacitor C7 is provided between the base of the transistor Q2 and the output line L1 of the rectification circuit 51. The first discharge resistance R5 is connected between the output line L1 of the rectification circuit 51 and the reference potential GND. The second discharge resistance R3 is connected between the emitter and base of the transistor Q2.

The capacitor C7 is charged by current Ib1 that is branched from the rectification circuit 51 and is discharged when the current Ib1 does not flow. As shown with a dashed-dotted line in FIG. 6, the discharge current of the capacitor C7 flows through a path of the first discharge resistance R5 and the second discharge resistance R3. For this reason, as shown in FIG. 4, during the off-period of the transistor Q2, a voltage of the base (the control terminal) becomes negative by an operation of the discharge current of the capacitor C7. Hence, the on-off operations of the transistor Q2 become stable, without malfunction of the transistor Q2 caused due to noises (during the off-period, the on operation of the transistor Q2 due to an influence of the noises is not made). Therefore, since it is possible to detect a signal having a stable pulse, as the pulse signal Sp, it is possible to improve the detection precision of the zero cross point ZP. In the meantime, a period hatched in FIG. 4 indicates a discharge cycle of the capacitor C7 and the voltage of the base of the transistor Q2 becomes negative during the period.

3. Effects

The output current (the rectified current) of the rectification circuit 51 configuring the small capacity power supply circuit 40 is significantly smaller by the operations of the first capacitor C4 and the second capacitor C5, compared to the output current (the rectified current) of the bridge diode D1 of the rectification smoothing circuit 21 configuring the switching power supply 20. For this reason, it is possible to detect the zero cross point ZP without using the photo coupler, by performing the zero cross detection method using the output current of the rectification circuit 51 configuring the small capacity power supply circuit 40. Therefore, compared to the zero cross detection method using the photo coupler, since it is not necessary to drive the photo diode so as to detect the zero cross point, it is possible to suppress the power consumption, thereby saving the power. Since the output of the rectification circuit 51 rectifies the AC output of the AC power supply 15, it is possible to maintain the detection reliability of the zero cross point ZP by detecting the zero cross point ZP based on the output of the rectification circuit 51.

In the power supply system S of this exemplified embodiment, the high resistance R6 is provided on the charging path L2 of the rectification circuit 51-side. For this reason, the current Ib of the lowest current value Imin or larger flows through the signal generation circuit 60 just after the power supply is input. Hence, it is possible to detect the zero cross point ZP of the AC power supply 15 just after the power supply is input.

The high resistance R6 can be replaced with other current limit element (for example, a transistor, an FET and the like). However, when a transistor or FET is used, a configuration where a degree that current may easily flow is changed by opening and closing the charging path L2 is made. Thereby, the circuit is complicated and the costs of the components are increased. In this regard, when a resistance is adopted, it is not necessary to perform the control, so that it is possible to simplify the configuration of the circuit and it is favorable as regards the costs.

In the power supply system S of this exemplified embodiment, the two charging paths to the electric double-layer capacitor C6 that is the electricity storage unit are provided. That is, the dedicated charging path (the path Lo2 of the switching power supply 20-side) that does not pass through the resistance R6 that is the current limit element is provided, in addition to the charging path (the path of the rectification circuit 51-side) via the resistance R6 that is the current limit element. For this reason, compared to a configuration where only one charging path via the resistance R6 is provided, there is a merit of charging the electric double-layer capacitor C6 in a short time.

The power supply system S of this exemplified embodiment is provided with the discharge unit that discharges charges, which are charged in the electric double-layer capacitor C6, without through the resistance R6. For this reason, it is possible to effectively discharge the charges, which are charged in the electric double-layer capacitor C6, to the light emitting diode LED2 and the like. Additionally, the discharge unit is configured by the forward diode D10. Therefore, it is possible to restrain the current from flowing from the output line L1 of the rectification circuit 51 towards the electric double-layer capacitor C6.

In particular, since an apparatus having the FAX function such as the multifunction apparatus 1 should record reception time of the FAX data, it is preferable to provide the RTC circuit 80 measuring the current time. However, since the apparatus having the RTC circuit 80 embedded therein should operate the RTC circuit 80 even at a state where the power is cut off, the capacity of the electricity storage unit (in this example, the electric double-layer capacitor C6) becomes larger. For this reason, it takes to charge the electricity storage unit after the power is input and the signal generation circuit 60 does not substantially operate during the charging period, so that it takes to make a state where it is possible to detect the zero cross point ZP of the AC power supply 15. When the power supply system S is applied to the multifunction apparatus 1, it is possible to considerably reduce the time after the power is input until the zero cross point ZP of the AC power supply 15 can be detected, which is very effective, compared to a configuration where the power supply system of the related art is mounted.

<Other Exemplified Embodiments>

The invention is not limited to the above exemplified embodiment shown in the drawings and following exemplified embodiments are also included in the technical scope of the invention.

(1) In the above exemplified embodiment, the power supply system S is applied to the multifunction apparatus 1. However, the power supply system S can be applied to any electric device and the utility of the power supply system S is not limited to the multifunction apparatus 1. For example, the power supply system S can be widely applied to home appliances such as a television, a video recorder and the like. Although the electrophotographic configuration has been exemplified as an example of the printing unit, an inkjet configuration is also possible.

Figure 7:
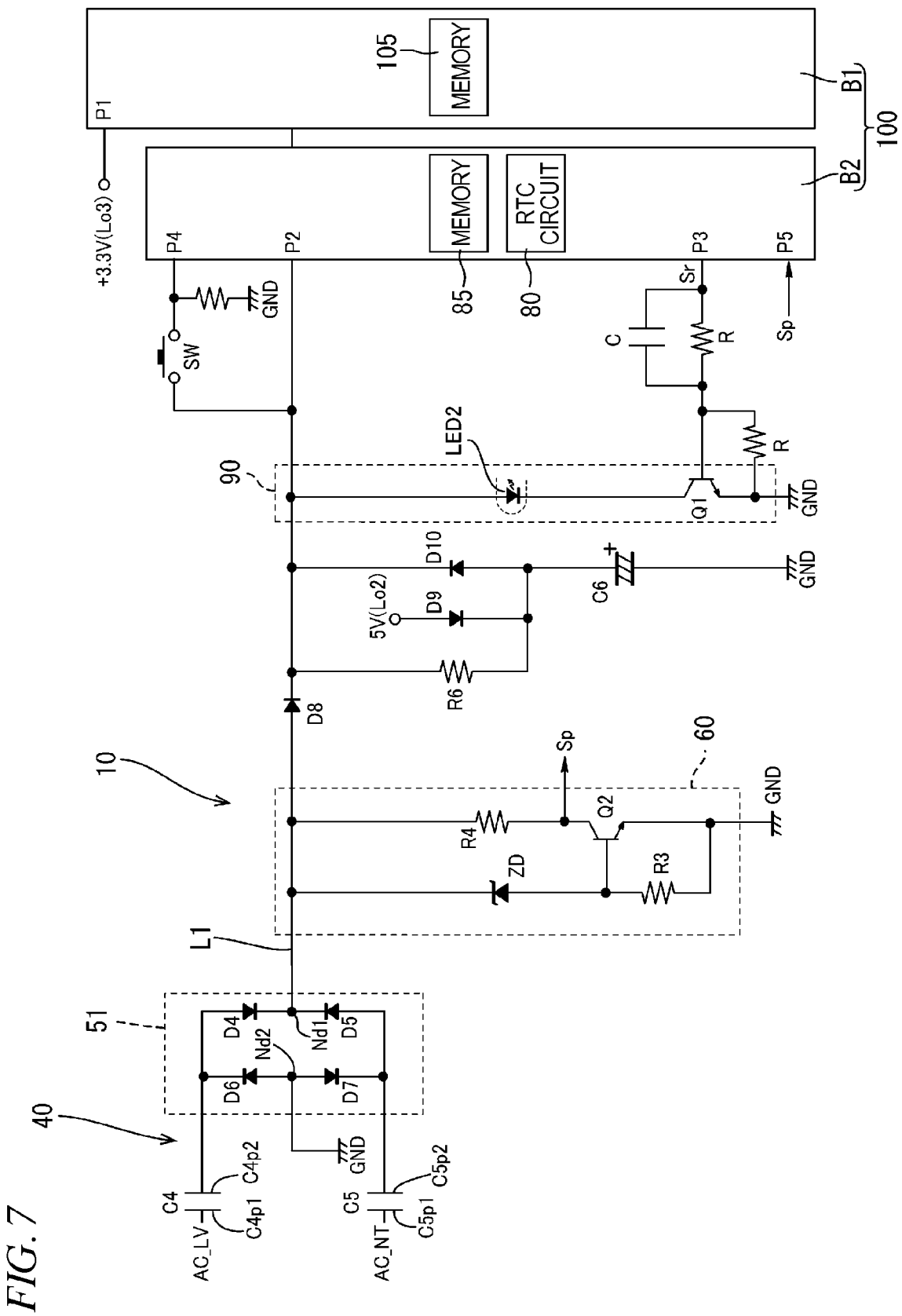
FIG. 7 is a circuit diagram showing another exemplified embodiment of the power supply device.

(2) In the above exemplified embodiment, the signal generation circuit 60 is provided with the reverse voltage applying circuit 70. However, the reverse voltage applying circuit 70 is not necessarily required. That is, as shown in FIG. 7, the capacitor C7 and the first discharge resistance R5 may be omitted. When the reverse voltage applying circuit 70 is omitted, an influence of the noises may be made. However, it is possible to simplify the configuration of the signal generation circuit 60. In the above exemplified embodiment, the resistance R4 of the signal generation circuit 60 is connected to the anode of the diode D8. However, the resistance R4 may be connected to the cathode of the diode D8.

(3) In the above exemplified embodiment, the electric double-layer capacitor C6 has been exemplified as an example of the electricity storage unit. However, any element may be used inasmuch as it can store the electricity. An electrolytic capacitor may be used.

What is claimed is:

1. A power supply system comprising:
   a first capacitor including a first electrode and a second electrode, the first electrode being connected to one end of an alternating current power supply;
   a second capacitor including a first electrode and a second electrode, the first electrode being connected to the other end of the alternating current power supply;
   a rectification circuit that is electrically connected between the second electrode of the first capacitor and the second electrode of the second capacitor and is configured to rectify an alternating current voltage applied to the first and second capacitors;
   a signal generation circuit that is connected to an output line of the rectification circuit and is configured to generate a detection signal corresponding to a zero cross point of an alternating current output of the alternating current power supply, based on an output of the rectification circuit;
   an electricity storage unit that is connected to the output line of the rectification circuit at a more downstream position than the signal generation circuit;
   a backflow regulation element that is provided on the output line of the rectification circuit and is configured to regulate backflow of current from the electricity storage unit towards the signal generation circuit;
   a current limit element configured to limit current flowing from the output line of the rectification circuit towards the electricity storage unit, and
   a control unit that is connected to the output line of the rectification circuit, and is configured to detect a zero cross point of the alternating current output, based on the detection signal.

2. The power supply system according to claim 1, further comprising:
   a switching power supply configured to rectify and smooth an alternating current voltage of the alternating current power supply and generate a predetermined direct current voltage; and
   a switching circuit configured to switch an output state where the switching power supply generates the direct current voltage and a stop state where the switching power supply stops generating the direct current voltage, wherein the electricity storage unit stores electricity by output current of the rectification circuit or output current of the switching power supply so that the electricity storage unit functions as a power supply of the switching circuit.

3. The power supply system according to claim 1, wherein the current limit element is a resistance.

4. The power supply system according to claim 1 further comprising a discharge unit that is connected in parallel to the current limit element and is configured to discharge charges charged in the electricity storage unit without through the current limit element.

5. The power supply system according to claim 4, wherein the discharge unit is a forward diode.

6. The power supply system according to claim 1, wherein the electricity storage unit includes a dedicated charging path configured to charge the electricity storage unit without passing through the current limit element.

7. The power supply system according to claim 1, wherein the signal generation circuit includes a switching device configured to be turned on and off based on an output of the rectification circuit and generate the detection signal corresponding to the alternating current output of the alternating current power supply.

8. The power supply system according to claim 7 further comprising a reverse voltage applying circuit configured to turn off the switching device by applying, to a control terminal of the switching device, a voltage having a reverse polarity to a voltage turning on the switching device.

9. The power supply system according to claim 8, wherein
the switching device includes a transistor having an emitter connected to a reference potential-side and a collector connected to the output line of the rectification circuit, and
the reverse voltage applying circuit includes:
a capacitor provided between a base of the transistor and the output line of the rectification circuit,
a first discharge resistance connected between the output line of the rectification circuit and the reference potential, and
a second discharge resistance connected between the emitter and base of the transistor.

10. An image forming apparatus comprising:
a power supply system comprising:
a first capacitor including a first electrode and a second electrode, the first electrode being connected to one end of an alternating current power supply;
a second capacitor including a first electrode and a second electrode, the first electrode being connected to the other end of the alternating current power supply;
a rectification circuit that is electrically connected between the second electrode of the first capacitor and the second electrode of the second capacitor and is configured to rectify an alternating current voltage applied to the first and second capacitors;
a signal generation circuit that is connected to an output line of the rectification circuit and is configured to generate a detection signal corresponding to a zero cross point of an alternating current output of the alternating current power supply, based on an output of the rectification circuit;
an electricity storage unit that is connected to the output line of the rectification circuit at a more downstream position than the signal generation circuit;
a backflow regulation element that is provided on the output line of the rectification circuit and is configured to regulate backflow of current from the electricity storage unit towards the signal generation circuit;
a current limit element configured to limit current flowing from the output line of the rectification circuit towards the electricity storage unit, and
a control unit that is connected to the output line of the rectification circuit, and is configured to detect a zero cross point of the alternating current output, based on the detection signal; and
an image forming unit that forms an image,
wherein the control unit controls the image forming unit by using the detection of the zero cross point.

11. The image forming apparatus according to claim 10, wherein the image forming apparatus includes a communication unit configured to transmit and receive FAX data and having a FAX function, and
wherein the control unit includes an RTC circuit configured to measure current time.

* * * * *